United States Patent [19]

Kaul

[11] Patent Number: 4,544,736
[45] Date of Patent: Oct. 1, 1985

[54] 1,4-DI-[2'-(2'',4''-DICHLOROPHENYLAZO)-3'-OXOBUTYRAMIDO]-2-METHOXYBENZENE

[75] Inventor: Bansi L. Kaul, Biel-Benken, Switzerland

[73] Assignee: Sandoz Ltd., Basel, Switzerland

[21] Appl. No.: 498,295

[22] Filed: May 26, 1983

[30] Foreign Application Priority Data

May 29, 1982 [DE] Fed. Rep. of Germany ....... 3220463

[51] Int. Cl.$^4$ .................... C09B 33/14; C09B 33/153; C09B 67/20
[52] U.S. Cl. ................ 534/575; 106/288 Q; 534/748
[58] Field of Search ............ 260/176, 208, 163, 156, 260/158, 162; 106/288 Q; 534/575, 748

[56] References Cited

U.S. PATENT DOCUMENTS

| 4,055,559 | 10/1977 | Cseh et al. ............... | 106/288 Q |
| 4,065,449 | 12/1977 | Cseh ........................ | 260/176 |
| 4,081,439 | 3/1978 | Hari et al. ................ | 260/176 |

FOREIGN PATENT DOCUMENTS

| 1,396,526 | 6/1975 | United Kingdom . |
| 1,400,533 | 7/1975 | United Kingdom . |
| 1,404,348 | 8/1975 | United Kingdom . |
| 2,035,356 | 6/1980 | United Kingdom . |

*Primary Examiner*—Herbert J. Lilling
*Attorney, Agent, or Firm*—Gerald D. Sharkin; Richard E. Vila; Melvyn M. Kassenoff

[57] ABSTRACT

The compound of the formula

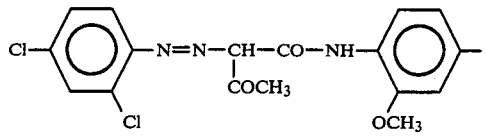

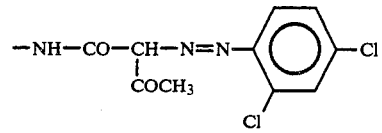

exists in an α-modification and a β-modification, the latter being obtained by treatment of the α-form with a boiling organic solvent, each of which, but especially the β-modification, is useful as a pigment for the mass pigmentation of synthetic plastics and resins, free from or containing a solvent (e.g., viscose, cellulose acetate, polyethylene, polystyrene, polyvinyl chloride, synthetic leathers and synthetic rubbers), surface coatings (e.g., oil- and water-based paints), lacquers and inks and for pigment printing, textile coating and pigmenting paper in the mass.

1 Claim, No Drawings

1,4-DI-[2'-(2'',4''-DICHLOROPHENYLAZO)-3'-OXOBUTYRAMIDO]-2-METHOXYBENZENE

The present invention provides the compound of formula I

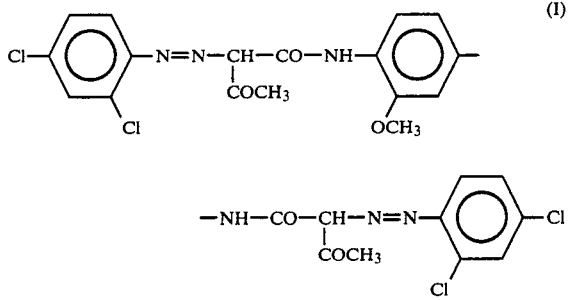

useful as a pigment, and a process for its production by diazotisation of 2 moles of 2,4-dichloroaniline and coupling of the diazonium salt with 1 mole of 1,4-bis-(acetoacetylamino)-2-methoxybenzene. The starting materials are known and the reaction is carried out in conventional manner.

The compound of formula I exists in at least two distinct solid forms, the α-modification and the β-modification. The product obtained directly from diazo coupling is generally the α-modification. The β-form may be obtained when the α-form is treated with a hot organic solvent.

Suitable solvents for the production of the β-modification are, for example, ethanol, glycol ethers, acetic acid, benzene, nitrobenzene, toluene, formamide and dialkylformamides, preferably dimethylformamide. Preferably the pigment is treated at the boiling point with a solvent boiling between 70° C. and 170° C. for at least 30 minutes, more preferably 1 to 3 hours.

In a preferred embodiment, the α-modification is treated with dimethylformamide at the boiling point for about 1 hour. It is then filtered at a temperature above 100° C., preferably at 120° C., and washed with dimethylformamide and finally with water.

The resulting β-modification can be employed as a pigment directly, that is after it has been dried. Alternatively, it may be subjected to a simple grinding treatment, i.e. alone in the absence of a water-soluble salt or other medium. It is particularly advantageous to obtain a pigment in a suitable stable pigmentary form without involving the complex and long processing treatments usually required for the conditioning of pigments.

The two modifications of the compound of formula I may be distinguished by their X-ray diffraction spectra. Table 1 shows the interplanar spacing (d-values) in Angstrom units of the observed lines in the X-ray diffraction spectrum, as measured by a Guinier/De Wolff camera using $CuK_\alpha$ radiation. The intensity of the lines was estimated visually on a 3 step scale: very weak (vw); weak (w); medium (m). The letter d indicates that the line is diffuse.

TABLE 1

| α-modification | | β-modification | | |
|---|---|---|---|---|
| d-value (Å) | intensity | line | d-value (Å) | intensity |
| 8.75 | wd | 1 | 8.5 | vwd |
| 3.29 | md | 2 | 7.5 | vwd |
|  |  | 3 | 3.88 | wd |
|  |  | 4 | 3.7 | vwd |
|  |  | 5 | 3.5 | vwd |
|  |  | 6 | 3.28 | m |
|  |  | 7 | 3.16 | vwd |

The compound of formula I, in either modification or as a mixture of both, preferably in the β-form, is useful as a pigment suitable for the mass pigmenting of synthetic plastics and resins, free from or containing solvents, e.g. viscose, cellulose acetate, polyethylene, polystyrene, polyvinyl chloride and synthetic leathers and rubbers, of surface coatings, such as paints, whether oil or water based, lacquers and inks. It may also be used in pigment printing, textile coating and for pigmenting paper in the mass. It may be employed for such uses in conventional manner and in conventional amounts. It is particularly useful in the pigmentation of paints and lacquers.

The pigmentations obtained using the compound of formula I have notably good fastness properties, particularly fastness to light and to migration. It is found, however, that the fastness properties of the β-modification are superior to those of the α-modification. The compound of formula I in the β-modification is preferred.

The following Examples, in which parts are by weight and temperatures are in degrees Centigrade, illustrate the invention:

EXAMPLE 1

Preparation of the α-modification

A mixture of 32.4 parts 2,4-dichloroaniline, 185 parts water and 85 parts 30% hydrochloric acid is heated to 90° and stirred at this temperature for approx. 30 minutes until a clear solution is obtained. The solution is then cooled to room temperature and the chlorhydrate is obtained in the form of a grey precipitate. After stirring for 12 hours, there is added to the mixture 60 parts ice and, over the course of 5 minutes, 52 parts of a 4N sodium nitrite solution while maintaining the temperature at 0°–5°. The precipitate slowly dissolves during stirring and stirring is continued for 1 hour with cooling to 0°–5°, whereby an excess of nitrous acid must still be detectable. This excess is finally destroyed by the addition of about 5 parts 1N amidosulphonic acid. The diazo solution is then clarified by filtration with addition of 2 parts filtering earth (Hyflo-Supercel$^R$).

30.4 Parts 1,4-bis-(acetoacetylamino)-2-methoxybenzene are dissolved in 250 parts water and 70 parts 30% caustic soda and after addition of 2 parts filtering earth (Hyflo-Supercel$^R$) the mixture is clarified by filtration, added to a mixture of 250 parts water, 45 parts acetic acid and 6 parts of a commercial surfactant and cooled to 0°–5°. To this solution is then added dropwise over the course of 6–7 hours and with stirring the diazo solution, also cooled to 0°–5°. The resulting mixture is further stirred for 12 hours without cooling. The precipitate is filtered off, washed with 3000 parts warm water (70°) and dried at 70° under vacuum, to give the compound of formula I as a yellow powder.

EXAMPLE 2

Preparation of the β-modification

65 Parts of the dried product of Example 1 is introduced into 500 parts dimethylformamide and the resulting mixture is treated at the boiling temperature with refluxing for 1 hour. After cooling to 120°, the resulting mixture is filtered, the precipitate is washed with a small amount of dimethylformamide then with water and dried under vacuum. The resulting product is ground to give a fine powder of the β-modification of the compound of formula I.

EXAMPLE 3

Four parts of the pigment of Example 2 are added to 96 parts of a mixture of
50 parts of a 60% solution of coco aldehyde-melamine resin of 32% solid content in xylene,
30 parts of a 50% melamine resin solution in butanol,
10 parts of xylene and
10 parts of ethylene glycol monoethylether
and the mixture ground for 24 hours in a ball mill. The dispersion obtained is sprayed on an aluminum sheet, the spray coating allowed to dry in the air for 30 minutes and then stoved for 30 minutes at 120°. An orange film with very good light and weathering fastness is obtained.

What is claimed is:

1. The β-modification of the compound of the formula

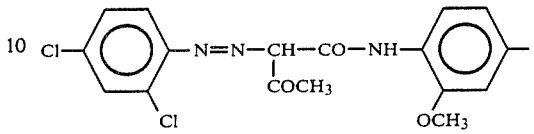
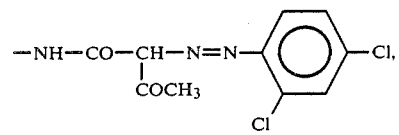

said β-modification having an X-ray diffraction spectrum (CuK$_\alpha$ radiation) exhibiting lines at d-values of 8.5, 7.5, 3.88, 3.7, 3.5, 3.28 and 3.16 Å.

* * * * *